US012657402B2

(12) United States Patent (10) Patent No.: US 12,657,402 B2
Bardhan et al. (45) Date of Patent: Jun. 16, 2026

(54) SYSTEMS AND METHODS FOR UTILIZING LARGE LANGUAGE MODELS (LLMs) FOR IMPROVING MACHINE LEARNING MODELS IN NETWORK AND COMPUTER SECURITY

(71) Applicant: Zscaler, Inc., San Jose, CA (US)

(72) Inventors: Manikya Bardhan, Bengaluru (IN); Raimi Shah, Austin, TX (US); Chenhui Hu, Boston, MA (US); Hanchen Xiong, London (GB); Nikhil Saini, Bengaluru (IN); Aayush Kumar, Bengaluru (IN)

(73) Assignee: Zscaler, Inc., San Jose, CA (US)

( * ) Notice: Subject to any disclaimer, the term of this patent is extended or adjusted under 35 U.S.C. 154(b) by 111 days.

(21) Appl. No.: 18/522,769

(22) Filed: Nov. 29, 2023

(65) Prior Publication Data

US 2025/0119432 A1 Apr. 10, 2025

(30) Foreign Application Priority Data

Oct. 10, 2023 (IN) .............................. 202341067875

(51) Int. Cl.
G06F 40/40 (2020.01)
G06F 9/451 (2018.01)
(Continued)

(52) U.S. Cl.
CPC .............. G06F 40/40 (2020.01); G06F 9/453 (2018.02); G06F 21/54 (2013.01); G06F 40/284 (2020.01); G06N 5/043 (2013.01); H04L 41/16 (2013.01); H04L 43/062 (2013.01); H04L 63/102 (2013.01)

(58) Field of Classification Search
CPC ........ G06F 40/40; G06F 40/157; G06F 40/30; G06F 21/54; G06F 21/566; G06F 21/554; G06F 9/453; G06F 9/54; G06F 40/284; G06F 16/288; G06F 16/29; G06F 16/221; G06F 16/2237; G06F 16/243; G06F 16/2282; G06F 16/24553; G06V 30/19173; G06T 19/006; H04L 43/062; H04L 41/16;
(Continued)

(56) References Cited

U.S. PATENT DOCUMENTS 10,489,393 B1 11/2019 Mittal et al.
10,963,497 B1 3/2021 Tablan et al.
(Continued)

FOREIGN PATENT DOCUMENTS

CN 109617968 A * 4/2019 ............. G06N 5/043

*Primary Examiner* — Kyung H Shin
(74) *Attorney, Agent, or Firm* — Baratta Law PLLC; Lawrence A. Baratta, Jr.; Ryan Odessa

(57) ABSTRACT

Systems and methods for utilizing Large Language Models (LLMs) for improving machine learning models in network and computer security include obtaining tabular data related to an aspect of networking and computer security; converting the tabular data to natural language for each row in the tabular data; inputting the natural language for each row in the tabular data into a Large Language Model (LLM); obtaining an output from the LLM for each row in the tabular data with embedded data therewith; and utilizing the output to train a machine learning model related to the aspect of networking and computer security.

20 Claims, 10 Drawing Sheets

(51) Int. Cl.

| | |
|---|---|
| *G06F 21/54* | (2013.01) |
| *G06F 40/284* | (2020.01) |
| *G06N 5/043* | (2023.01) |
| *H04L 9/40* | (2022.01) |
| *H04L 41/16* | (2022.01) |
| *H04L 43/062* | (2022.01) |

(58) Field of Classification Search

CPC ..... H04L 41/122; H04L 67/12; H04L 5/0035; G06N 5/043

See application file for complete search history.

(56) References Cited

U.S. PATENT DOCUMENTS

| | | | |
|---|---|---|---|
| 11,475,368 B2 | 10/2022 | Shang et al. | |
| 11,633,860 B2 | 4/2023 | Lázaro-Gredilla et al. | |
| 11,669,779 B2 | 6/2023 | Lin et al. | |
| 11,755,726 B2 | 9/2023 | Ma et al. | |
| 11,967,033 B1* | 4/2024 | Pisoni | G06V 30/19173 |
| 12,135,978 B1* | 11/2024 | Starratt | G06F 9/453 |
| 2019/0251476 A1 | 8/2019 | Shiebler et al. | |
| 2020/0320192 A1 | 10/2020 | Ma et al. | |
| 2021/0049413 A1 | 2/2021 | Ma et al. | |
| 2021/0377303 A1 | 12/2021 | Bui et al. | |
| 2021/0377304 A1 | 12/2021 | Ma et al. | |
| 2021/0392146 A1 | 12/2021 | Lin et al. | |
| 2021/0392147 A1 | 12/2021 | Ma et al. | |
| 2022/0067581 A1 | 3/2022 | Kumar et al. | |
| 2022/0121636 A1* | 4/2022 | Zheng | G06F 40/284 |
| 2023/0018188 A1 | 1/2023 | Shang et al. | |
| 2023/0115982 A1 | 4/2023 | Lin et al. | |
| 2023/0155902 A1 | 5/2023 | Frazier et al. | |
| 2023/0254318 A1 | 8/2023 | Hu et al. | |
| 2024/0195699 A1* | 6/2024 | Singhal | H04L 43/062 |
| 2024/0412004 A1* | 12/2024 | Manikandan | G06F 40/40 |
| 2025/0111051 A1* | 4/2025 | Mantin | G06F 21/54 |

* cited by examiner

Figure 6:
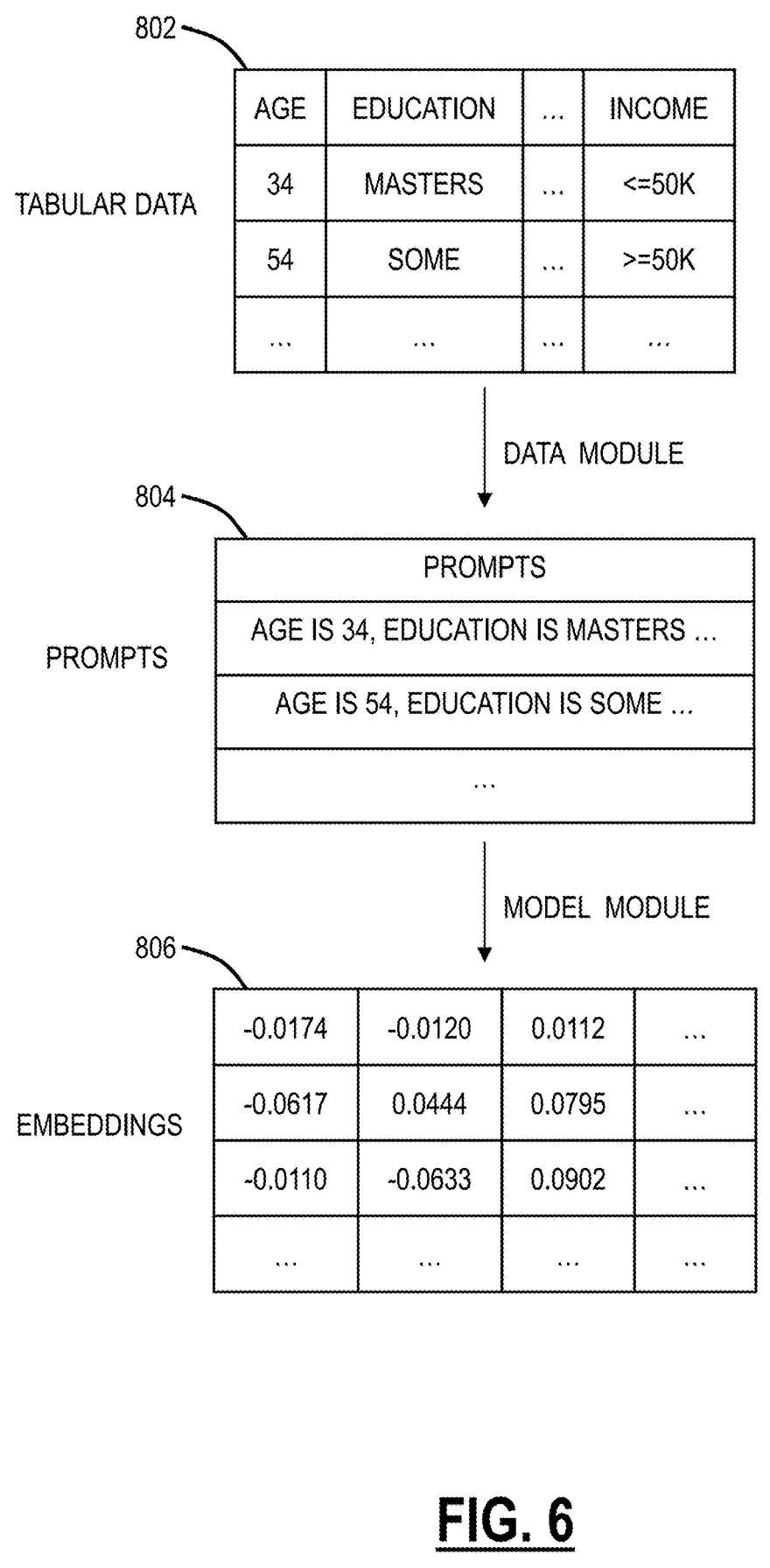

TABULAR DATA

| AGE | EDUCATION | ... | INCOME |
|-----|-----------|-----|--------|
| 34 | MASTERS | ... | <=50K |
| 54 | SOME | ... | >=50K |
| ... | ... | ... | ... |

DATA MODULE

804

PROMPTS

| PROMPTS |
|---------|
| AGE IS 34, EDUCATION IS MASTERS ... |
| AGE IS 54, EDUCATION IS SOME ... |
| ... |

MODEL MODULE

806

EMBEDDINGS

| -0.0174 | -0.0120 | 0.0112 | ... |
|---------|---------|--------|-----|
| -0.0617 | 0.0444 | 0.0795 | ... |
| -0.0110 | -0.0633 | 0.0902 | ... |
| ... | ... | ... | ... |

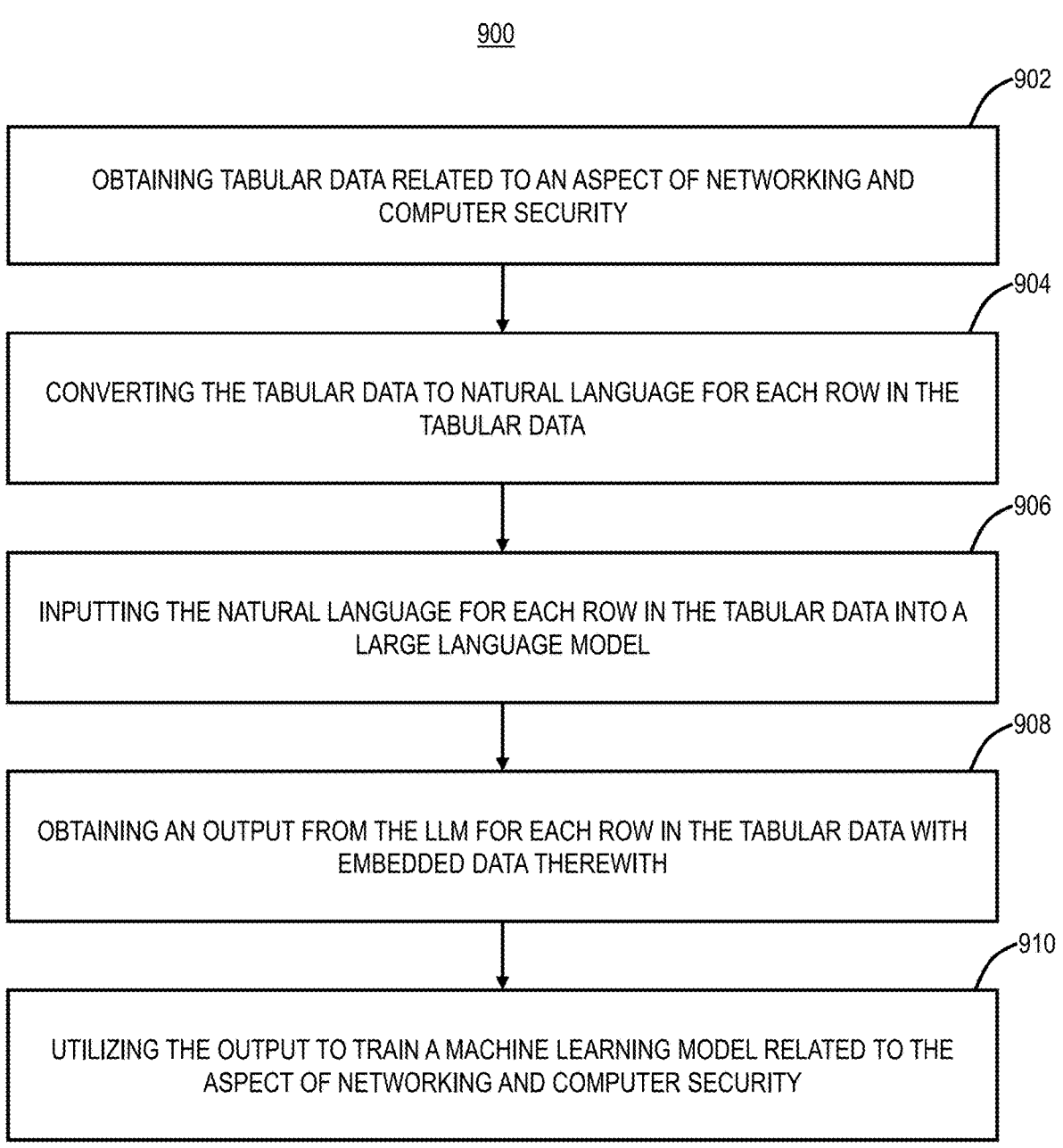

902

OBTAINING TABULAR DATA RELATED TO AN ASPECT OF NETWORKING AND
COMPUTER SECURITY

904

CONVERTING THE TABULAR DATA TO NATURAL LANGUAGE FOR EACH ROW IN THE
TABULAR DATA

906

INPUTTING THE NATURAL LANGUAGE FOR EACH ROW IN THE TABULAR DATA INTO A
LARGE LANGUAGE MODEL

908

OBTAINING AN OUTPUT FROM THE LLM FOR EACH ROW IN THE TABULAR DATA WITH
EMBEDDED DATA THEREWITH

910

UTILIZING THE OUTPUT TO TRAIN A MACHINE LEARNING MODEL RELATED TO THE
ASPECT OF NETWORKING AND COMPUTER SECURITY

FIG. 8

SYSTEMS AND METHODS FOR UTILIZING LARGE LANGUAGE MODELS (LLMs) FOR IMPROVING MACHINE LEARNING MODELS IN NETWORK AND COMPUTER SECURITY

FIELD OF THE DISCLOSURE

The present disclosure relates generally to networking and computing. More particularly, the present disclosure relates to systems and methods for utilizing Large Language Models (LLMs) for improving machine learning models in network and computer security.

BACKGROUND OF THE DISCLOSURE

Content classification helps identify and categorize various types of data and information on the internet to ensure its appropriate handling, protection, and filtering by various security systems. Identifying and categorizing features associated with content in cloud environments is a long and tedious process. Cloud providers utilize large, dedicated teams for performing content classification and feature extraction. These traditional methods include various steps performed by humans, such as manually reviewing content to determine its nature, context, and potential risks. These methods both cost cloud providers large amounts of time, while delaying classification of potentially risky content. Efficient content categorization and classification is crucial for training cloud-based security solutions and protecting both users and devices accessing the internet. In addition to content classification, there are various other use cases for machine learning in network and computer security, such as, for example, malware detection, identifying malicious files for further processing such as in a sandbox, user risk determination, content classification, intrusion detection, phishing detection, application segmentation, and the like.

BRIEF SUMMARY OF THE DISCLOSURE

The present disclosure provides systems and methods for utilizing Large Language Models (LLMs) for improving machine learning models in network and computer security, such as, for example, malware detection, identifying malicious files for further processing such as in a sandbox, user risk determination, content classification, intrusion detection, phishing detection, application segmentation, and the like. In an embodiment, the present disclosure includes a method with steps, a cloud-based system configured to implement the steps, and a non-transitory computer-readable medium storing computer-executable instructions for causing performance of the steps. The steps include obtaining tabular data related to an aspect of networking and computer security; converting the tabular data to natural language for each row in the tabular data; inputting the natural language for each row in the tabular data into a Large Language Model (LLM); obtaining an output from the LLM for each row in the tabular data with embedded data therewith; and utilizing the output to train a machine learning model related to the aspect of networking and computer security. The tabular data can be obtained from a cloud-based system, and wherein the tabular data includes data collected based on inline monitoring of users, the Internet, and cloud services.

The aspect of networking and computer security can include application segmentation, wherein the tabular data relates to users, data associated with the users, and application permissions for the users. The machine learning model can be trained to determine what applications a new user should have access permissions. The aspect of networking and computer security can include application segmentation, wherein the tabular data relates to users, identification information for the users, and server ports for applications are used by the users, and wherein the machine learning model is trained to determine which of the applications a new user should have access permissions. The aspect of networking and computer security can include classifications, wherein the tabular data relates to transactions and associated classifications. The classifications can be for content of an associated Uniform Resource Location (URL).

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud-based system and a comparison with the conventional firewall-based approach.

FIG. 4 is a block diagram of a user device, which may be used with the cloud-based system or the like.

FIG. 6 is a flow diagram of an example for converting tabular data to prompts for creating embeddings therefrom.

FIG. 8 is a flow chart of a process for utilizing LLMs for network and computer security.

DETAILED DESCRIPTION OF THE DISCLOSURE

Again, the present disclosure provides systems and methods for utilizing Large Language Models (LLMs) for improving machine learning models in network and computer security, such as, for example, malware detection, identifying malicious files for further processing such as in a sandbox, user risk determination, content classification, intrusion detection, phishing detection, application segmentation, and the like.

Example Cloud-Based System Architecture

Figure 1A:
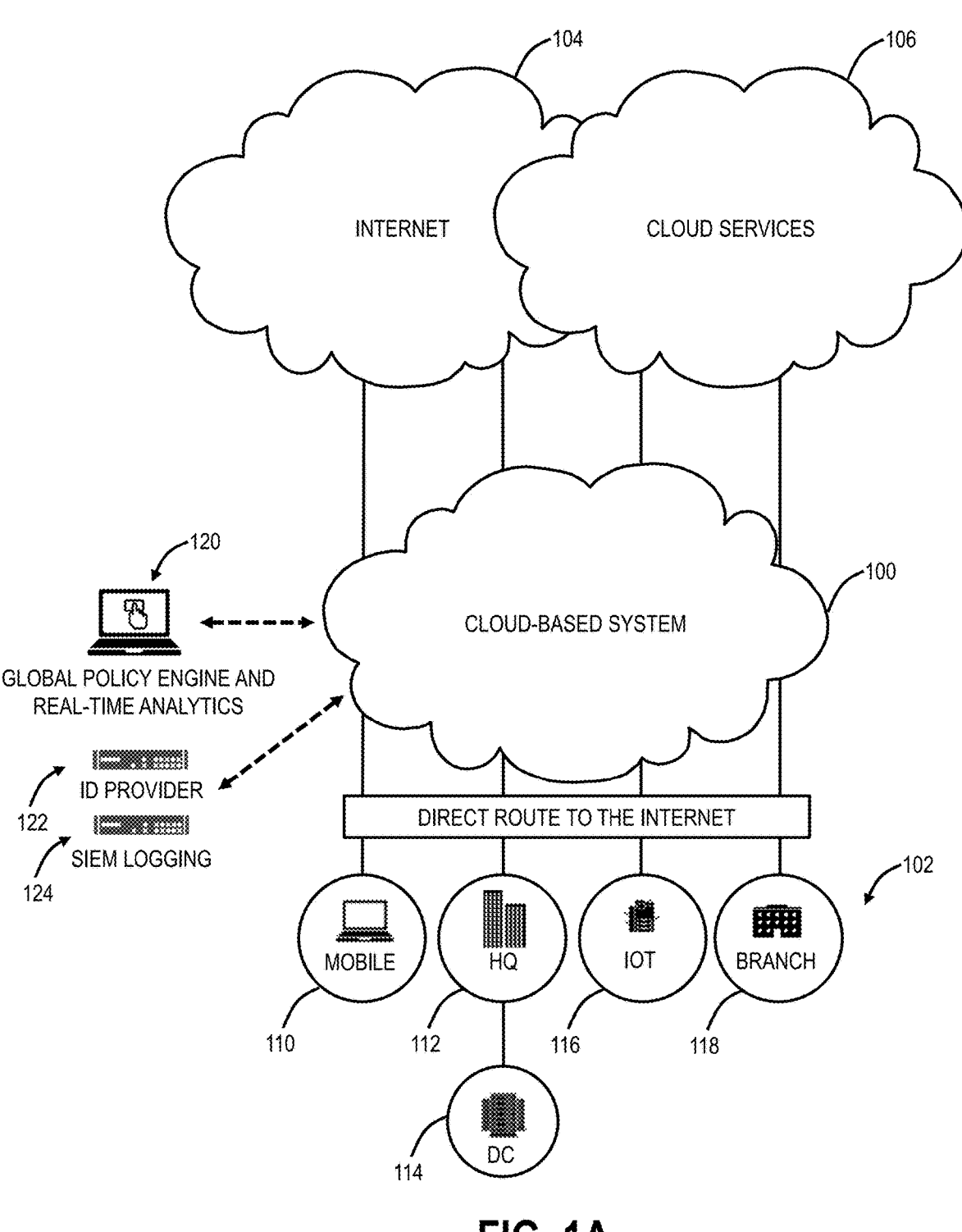
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system

100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 4:
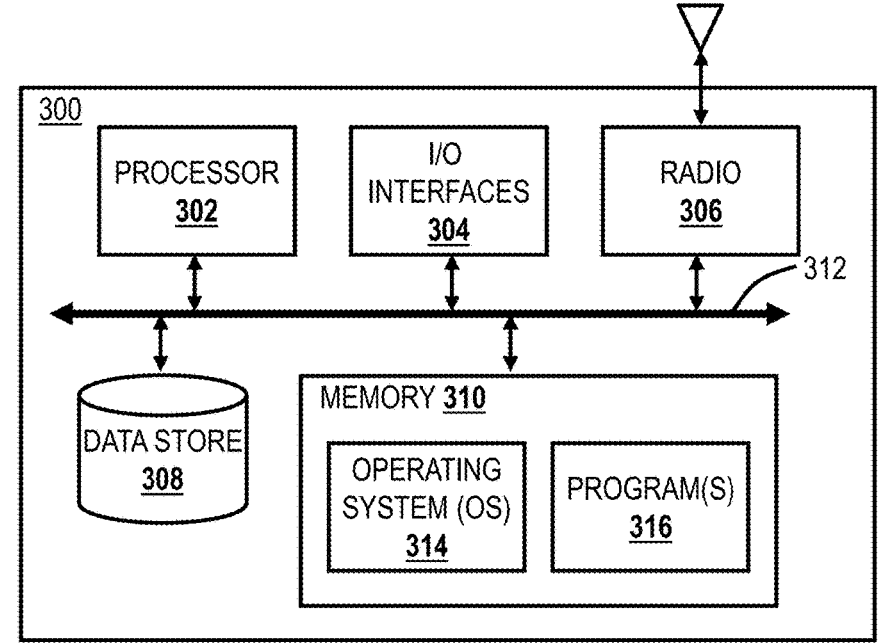

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 4). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
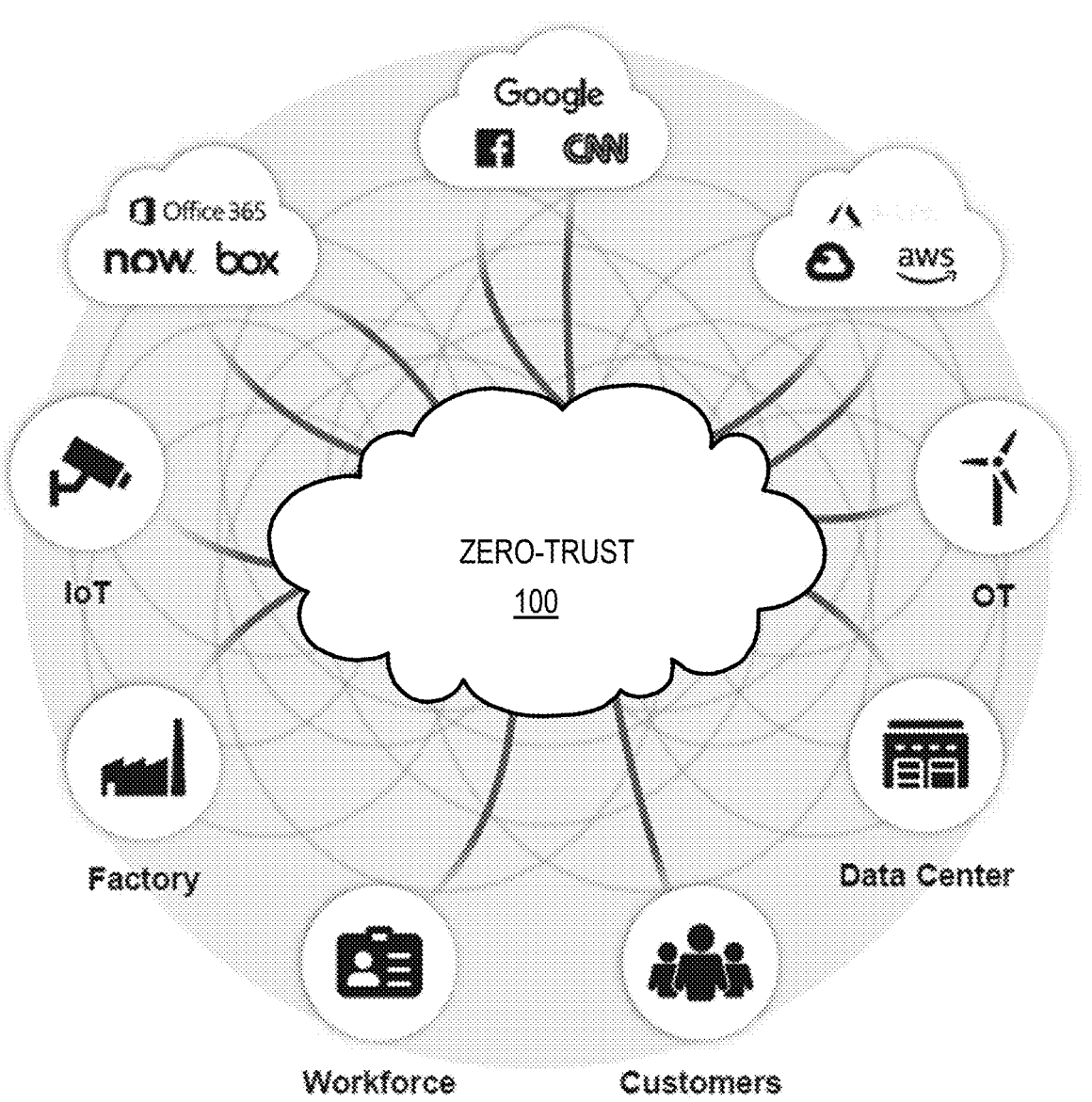
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
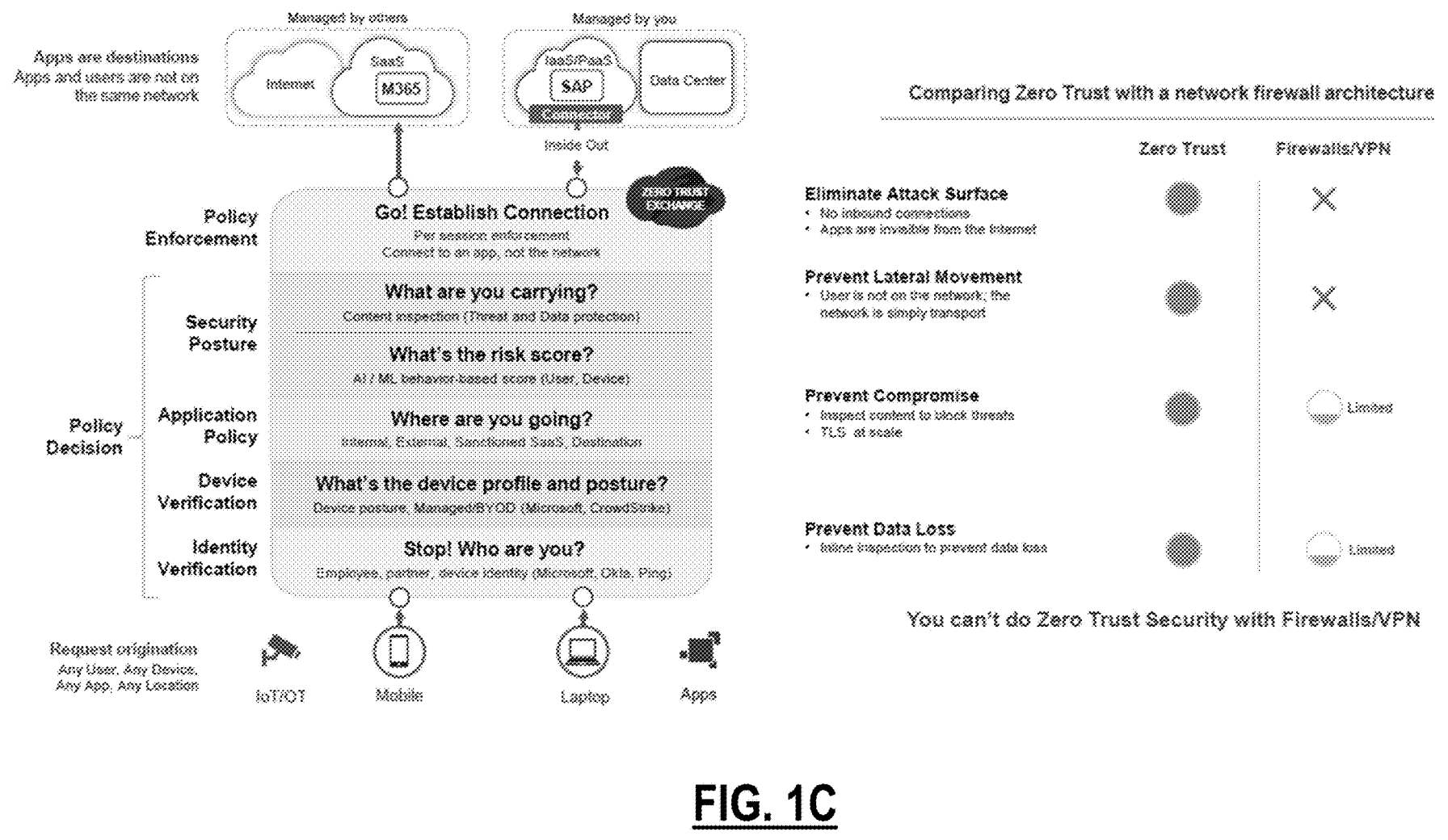

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
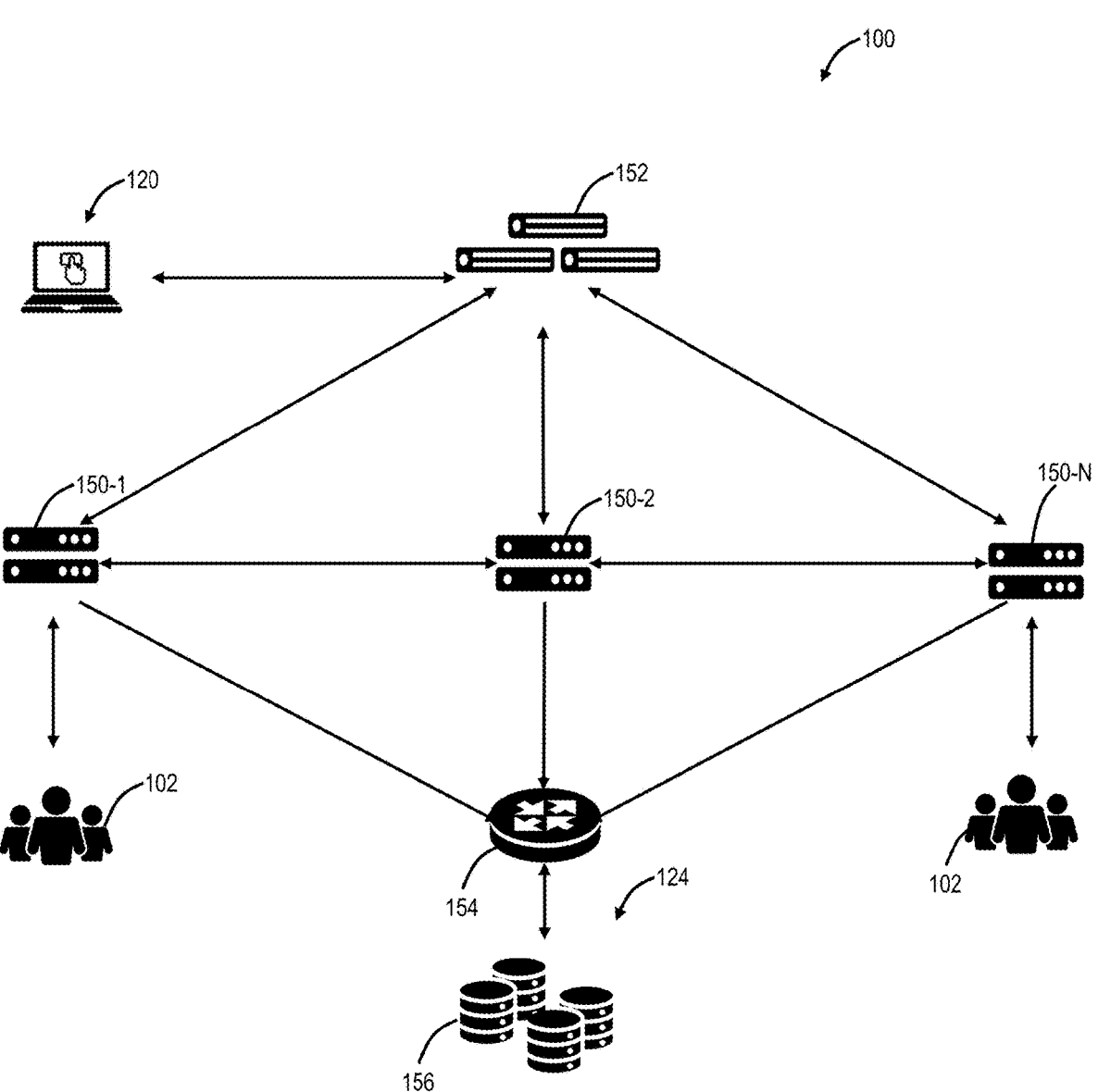
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
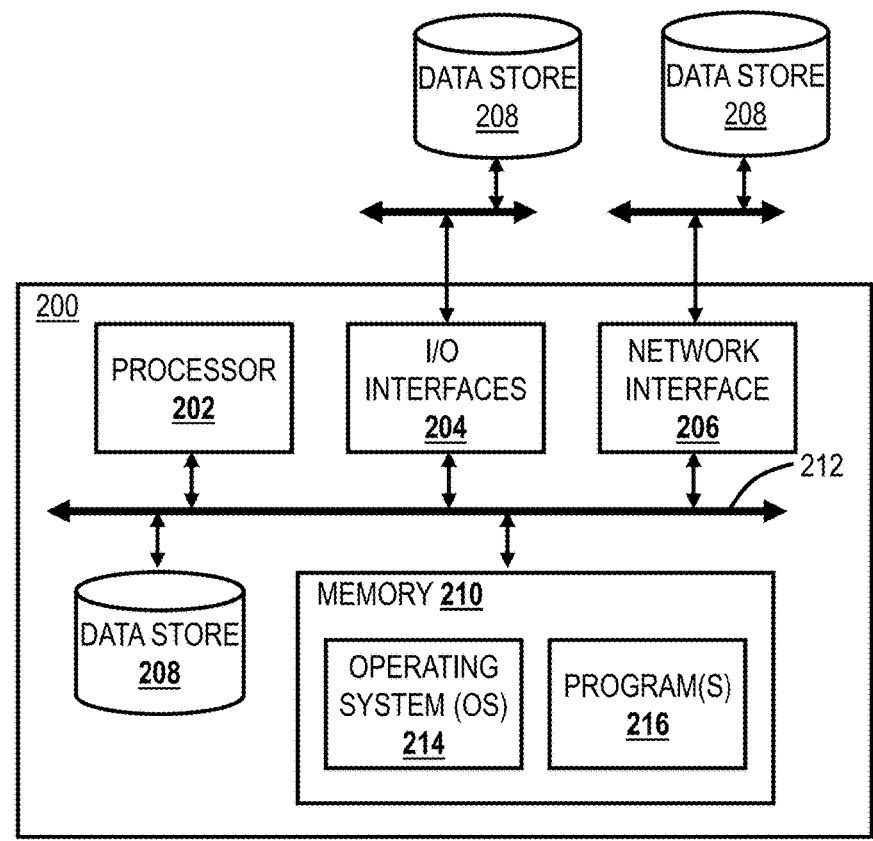
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200.

Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Model Training

Machine learning can be used in various applications in network and computer security, including malware detection, intrusion detection, threat classification, the user or content risk, detecting malicious clients or bots, application segmentation, etc. In production, a machine learning model is configured to provide some verdict, insight, classification, etc. For example, with malware detection, is a particular file suspect to be benign or malicious; with intrusion detection, is a particular data stream indicative of an intrusion attempt; with classification (e.g., threat, content, URL, etc.), is a particular communication representative of a particular classification; with application segmentation, should a particular user have access to a particular application, etc.

The general process in machine learning includes training where a machine learning model is trained on a dataset, and, once trained, the machine learning model is used in production (runtime) to classify unknown content based on the training. That is, the machine learning process includes a training step and a production step. Of course, the dataset is directed towards the particular application. For example, with malware detection, the dataset can include labeled malicious and benign files; with content classification, the dataset can include content with appropriate labels; with application segmentation, the dataset can include users with associated details and their application permissions.

A model training module can be configured to train a machine learning model based on data for modeling. For malware detection, the data for modeling can be selected from a set of benign files and a set of malicious files. Here, the set of benign files includes, for example, a list of files retrieved from one or more third party sources and/or cloud-based system logs. For application segmentation, the data for modeling can be selected from a list of users with details and their associated application permissions.

Retrieving Tabular Data

The cloud-based system 100 disclosed herein is adapted to collect large amounts of data from various tenants and cloud environments. This data can be in the form of tabular data. The cloud-based system 100 can be configured to consolidate logs from all users, globally, into a central repository that is determined by customers, where administrators can view and mine transaction data by user, device, application, and location in real time.

For organizations that need to transfer their logs to an enterprise Security Information and Event Management (SIEM) system or other location, the cloud-based system 100 provides a service as a virtual machine installed within the customer's network. The service can connect to the cloud-based system and stream out all logs for the tenant to the SIEM or other storage devices in real-time. The protocol used by the service to retrieve logs from the cloud is highly secure and guarantees that the logs cannot be tampered with in transit.

Figure 5:
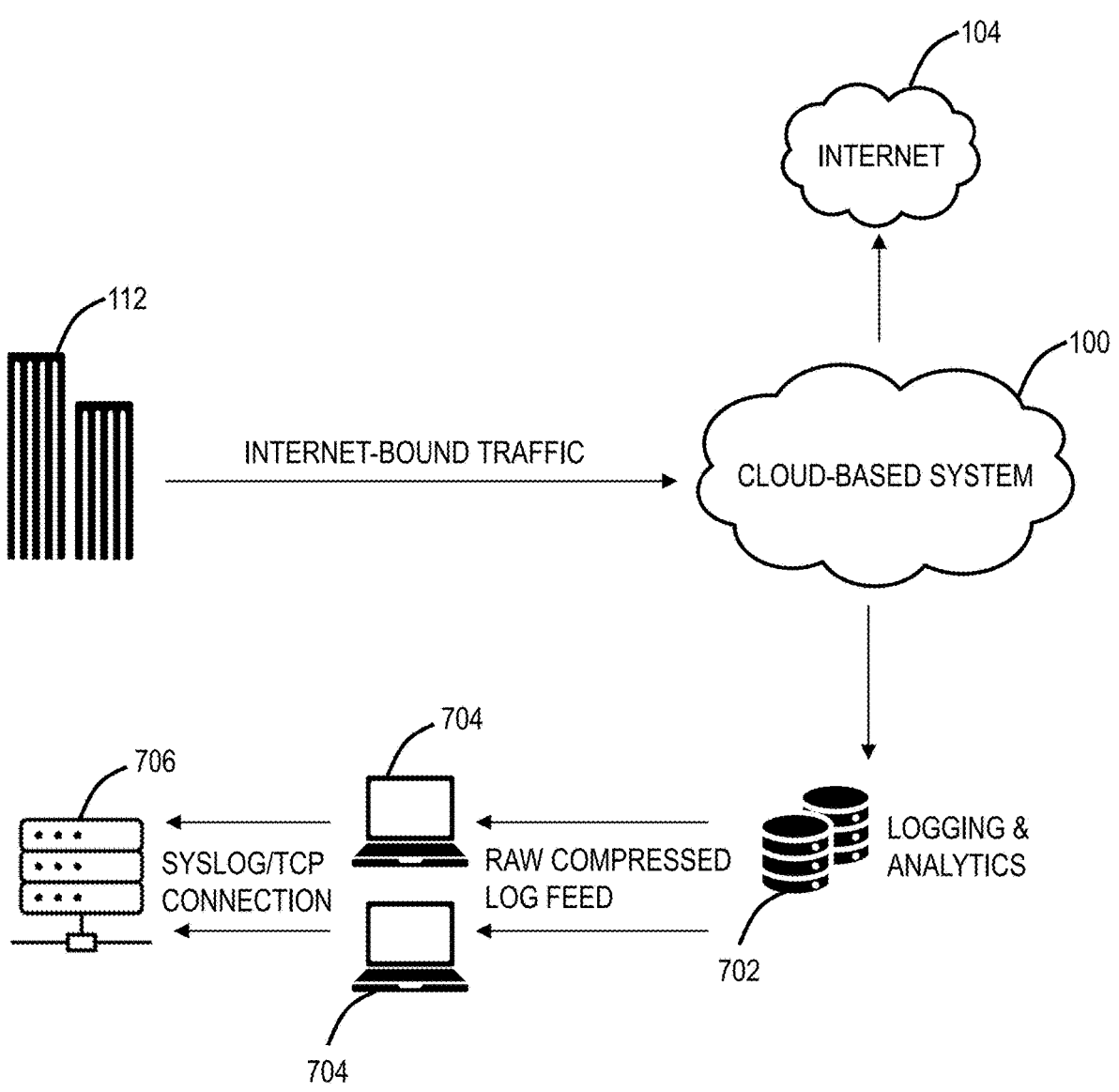
FIG. 5 is a flow diagram of a data streaming service for providing data associated with the cloud-based system

FIG. 5 is a flow diagram of a data streaming service for providing data associated with the cloud-based system 100. As shown in FIG. 5, web and firewall logs are stored in a log 702 in the cloud-based system 100. An organization can deploy the data streaming service instance 704 either on-premises, as an EC2 Instance, or as a Virtual Machine (VM). When an organization deploys an instance of the data streaming service 704 for web and another for firewall logs, each instance is adapted to open a secure tunnel to the log 705 in the cloud-based system 100. The log 702 then streams copies of the logs to each instance of the data streaming service in a highly compressed format to reduce bandwidth footprint. The original logs are retained on the log 702.

When an instance of the data streaming service 704 receives the logs from the log 702, it decompresses and detokenizes them, applies configured filters to exclude unwanted logs, converts the filtered logs to the configured output format so they can be consumed and parsed by the SIEM 706, then streams the logs to the SIEM 706 over a raw TCP connection.

Of note, the data from monitoring in the cloud-based system 100 can relate to various network and computer security applications, i.e., malware detection, intrusion detection, threat classification, the user or content risk, detecting malicious clients or bots, application segmentation, etc. This data can be used as the data for modeling for training a machine learning model for various network and computer security applications.

Large Language Model

A Large Language Model (LLM) refers to an Artificial Intelligence (AI) system that has been trained on a vast amount of text data and can generate human-like text responses. These models use deep learning techniques, particularly a type of neural network called a transformer, to process and understand the patterns, structure, and semantics of natural language. LLMs are trained on diverse datasets that include a wide range of text sources, such as books, articles, websites, and other written content. During the training process, the model learns to predict the next word or phrase in text based on the patterns it has observed in the training data.

Once trained, these models can be used to generate coherent and contextually relevant responses to prompts or questions. They have a wide range of applications, including natural language understanding, text generation, language translation, chatbots, content creation, and more. LLMs are designed to provide valuable insights, answer questions, engage in conversations, or assist with various language-related tasks.

LLMs are trained on large quantities of unlabeled text, such as the entire internet. Typically, an LLM is trained using self-supervised and/or semi-supervised learning. Unlike other machine learning models which are trained to excel at a specific task, an LLM is trained for a general purpose to perform well at a wide range of tasks. Typically, LLMs are pre-trained via various methods including but not limited to autoregressive and masked pre-training.

In various embodiments described herein, fine tuning a LLM can be utilized for optimizing the LLM for more specific tasks. Fine tuning can include modifying an existing pretrained LLM by training it on a specific task. This can be done in a supervised or unsupervised fashion. This fine tuning can involve an introduction of a new set of weights and causing the model to learn while utilizing the new set of weights during training.

An LLM can be further trained to utilize different tools, that is, an LLM can be trained to call on different programs to provide a desirable output. For example, an LLM can be augmented with document retrieval, typically utilizing a vector database. A document retriever can be called upon by the LLM, given a query, to retrieve relevant documents for generating an output. The LLM can then generate the output based on both the query and the retrieved documents.

Embeddings are a key building block of large language models. LLMs are composed of several key building blocks that enable them to efficiently process and understand natural language data. Embeddings are continuous vector representations of words or tokens that capture their semantic meanings in a high-dimensional space. They allow the model to convert discrete tokens into a format that can be processed by the neural network. In LLMs, embeddings are learned during the training process, and the resulting vector representations can capture complex relationships between words, such as synonyms or analogies.

Tabular Data Inputs for LLMs

LLMs such as ChatGPT can read and process tabular data. However, it is known that language models primarily excel at understanding and generating human language. While an LLM can handle structured data such as tables, it is important to note that LLMs capabilities are more trained to handle natural language processing rather than traditional data analysis.

An LLM can read the textual contents of cells in tabular data, interpret the context and relationships between the data points, and perform calculations, classifications, and manipulations. LLMs can understand column headers, row values, and even make predictions or recommendations based on the information present in the tabular data. For example, if a table of data is provided to an LLM, questions can be asked about the data, such as, for network data, finding the highest-visited resource, calculating total usage, identifying trends, and categorizing content. The model can read the text in the table and provide relevant responses or perform computations.

In other scenarios, in order to provide tabular data as inputs for an LLM, the tabular data must first be converted to text prompts which the LLM can utilize as an input. As described, large amounts of data are collected via the cloud-based system 100. This data can be in the form of large tabular datasets which are stored in logs. There are various approaches for converting tabular data to natural language which an LLM can utilize. These approaches can include using the LLM to provide predictions on unlabeled tabular data, such as embeddings. For example, one approach includes serializing feature names and values of tabular data into natural language strings. These strings can then be combined with task specific prompts. Output probabilities can be obtained from the LLM which can be used for fine tuning. Once tuning is completed, the tuned LLM can be used to obtain predictions on unlabeled tabular data.

Utilizing LLM Outputs for Network and Computer Security

The present disclosure provides systems and methods for utilizing Large Language Models (LLMs) for improving training of machine learning models for network and computer security. As described, the cloud-based system 100 collects a vast amount of data associated with users, tenants, organizations, etc. while monitoring. The systems and methods disclosed herein provide techniques for using LLMs with tabular data for providing insights that can be used to support, enhance, and train machine learning models for network and computer security systems such as the various security systems and models disclosed herein.

FIG. 6 is a flow diagram of an example for converting tabular data to prompts for creating embeddings therefrom. In an embodiment, the systems and methods include creating text prompts 804 using tabular data 802. These prompts 804 are then used as an input for LLMs, and steps can further include generating embeddings 806 therefrom. The present systems and methods propose applying the LLM embeddings 806 to security specific problems, such as providing the embeddings 806 for use in training a model for the network and computer security systems described herein. Since LLMs already have semantic knowledge about various domains, the generated embeddings 806 are meaningful and can effectively represent a row of tabular data. The generated embeddings 806 can be used for various downstream tasks. For example, when the present approach is demonstrated on a real-world use case of generating features for different applications in an intelligent policy use case, the approach gives good results over traditional methods of generating features. Such features can then be utilized by the security systems to train machine learning models and better enforce the policy.

Figure 7:
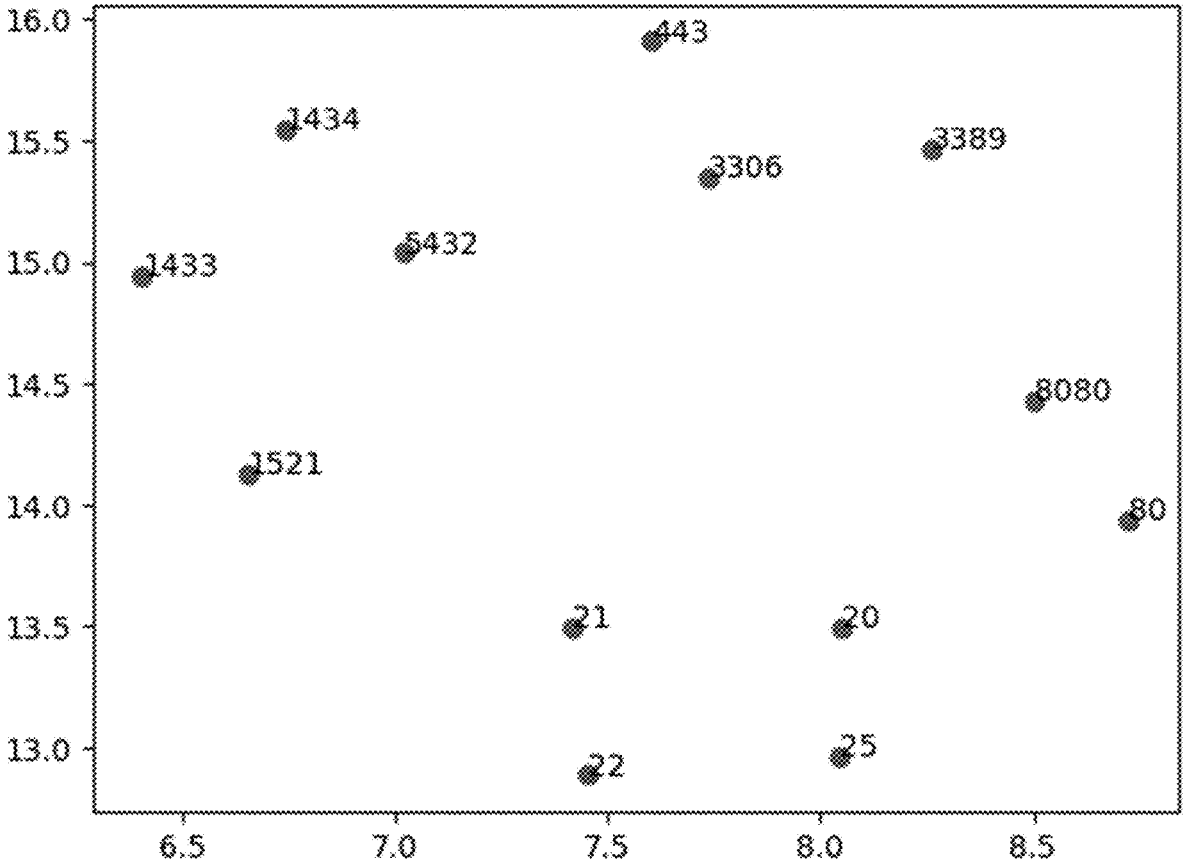
FIG. 7 is a graph representing relationships between a plurality of internet ports.

In an exemplary use case, the present systems and methods can be utilized for encoding domain knowledge in internet ports. FIG. 7 is a graph representing relationships between a plurality of internet ports. From the graph of FIG. 7, relationships can be drawn between the various ports. In this example, it can be seen that ports 1433, 1434, 5432, and

1521 are databases and ports 80, 8080, and 443 are HTTPS related. By embedding "internet server TCP port X" more data can be obtained such as which types of users/departments access each port, which can further improve separation/clustering. As described, if more specific domain knowledge is required, the LLM can be fine-tuned.

In various embodiments, an LLM can be utilized to uncover features and categorize content/resources in a cloud-based system. Content can include, but is not limited to, Uniform Resource Locator (URL) content, emails, and any other destination/resource. By utilizing LLMs to classify such content for network and computer security purposes, policy can be enforced more accurately, and models can be trained on more recent data. Traditionally, the content classification process is performed manually, which is time consuming and labor intensive.

In an embodiment, the output of the LLM can include port relationships. These relationships can then be utilized for training a model for use various cloud security systems described herein.

Process for Utilizing LLMs for Network and Computer Security

FIG. 8 is a flow chart of a process 900 for utilizing LLMs for network and computer security. The process 900 includes obtaining tabular data related to an aspect of networking and computer security (step 902); converting the tabular data to natural language for each row in the tabular data (step 904); inputting the natural language for each row in the tabular data into a Large Language Model (LLM) (step 906); obtaining an output from the LLM for each row in the tabular data with embedded data therewith (step 908); and utilizing the output to train a machine learning model related to the aspect of networking and computer security (step 910).

The tabular data can be obtained from a cloud-based system, and wherein the tabular data includes data collected based on inline monitoring of users, the Internet, and cloud services. The aspect of networking and computer security can include application segmentation, wherein the tabular data relates to users, data associated with the users, and application permissions for the users. The machine learning model can be trained to determine what applications a new user should have access permissions.

The aspect of networking and computer security can include application segmentation, wherein the tabular data relates to users, identification information for the users, and server ports for applications are used by the users, and wherein the machine learning model is trained to determine which of the applications a new user should have access permissions.

The aspect of networking and computer security can include classifications, wherein the tabular data relates to transactions and associated classifications. The classifications can be for content of an associated Uniform Resource Location (URL).

Experiments

For illustration, the impact of the approach described here was evaluated on an applied graph clustering problem. In Zscaler ZPA, microsegmentation is one area of zero-trust focusing on application-to-application traffic. There is a need to provide user-to-application policy recommendations for zero-trust. Such policies are needed to reduce the attack surface, but also need to be high quality in terms of the recommendations. Specifically, the policies define what users are allowed to access what applications, i.e., application segmentation.

To produce recommendations, we use a knowledge graph to encode user-app transactions, along with additional metadata about users and applications, for example, which departments/groups the users belong to, or which server ports applications use. We initialized a knowledge graph with the LLM embeddings, and compared the performance to the typical default initialization (e.g., Xavier uniform). We utilized early stopping, with patience=3, and delta=0.001. We compare the performance in various embedding metrics, convergence, and downstream clustering metrics.

Figure 9:
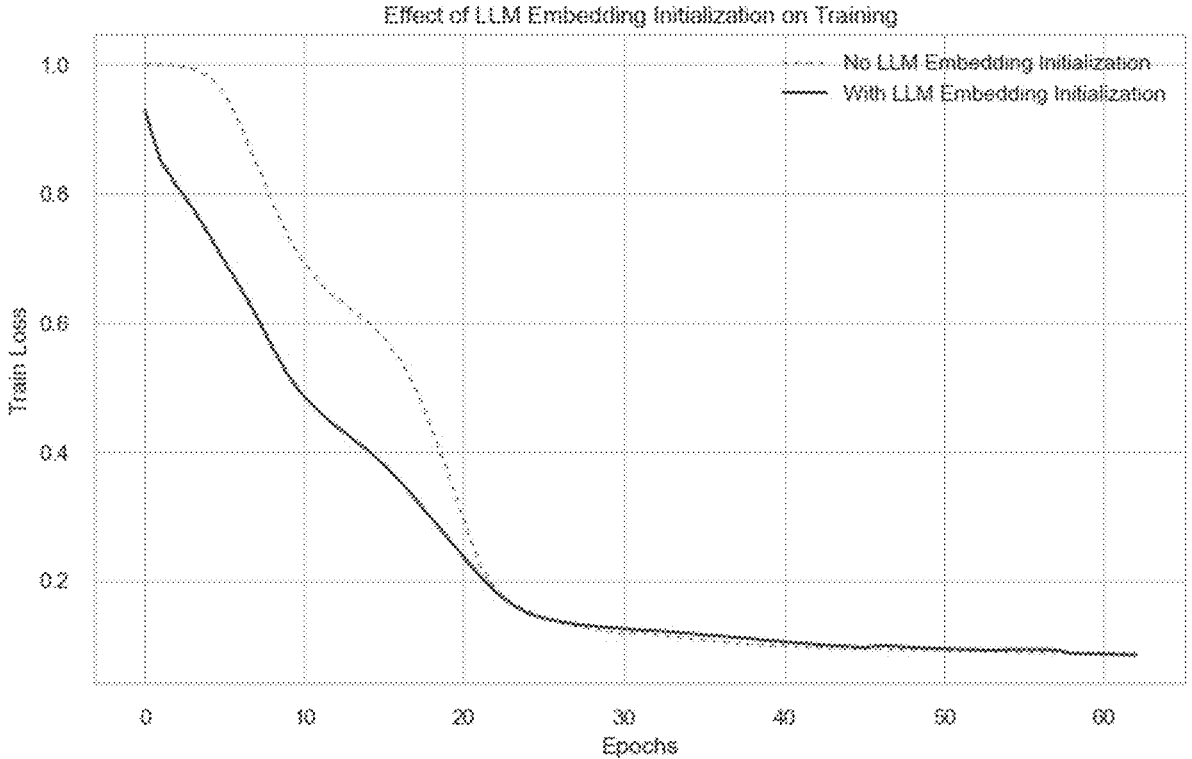
FIG. 9 is a graph of training loss versus training epochs illustrating the results with and without LLM embedding initialization.

FIG. 9 is a graph of training loss versus training epochs illustrating the results with and without LLM embedding initialization. The plots of training loss indicate a better initial loss, and a quicker "start" to convergence, though notably, the baseline models show faster convergence once it starts. The final loss values and the epoch that they are achieved at are very similar.

The following tables illustrate details associated with various datasets. Using the LLM embeddings, the MAP (Mean Average Precision) at 10, 50, 100 show average improvements of 2.5%, 2.7%, 1.4%, respectively. Similarly, for the MRR (Mean Reciprocal Rank) at 100, the average improvement is 1.3%. We also note that the evaluation relies on a subset of labels, and for those dataset where we have a higher proportion of labels, the scores are higher (datasets A and B).

For clustering, V-Measure shows average improvements of 1.6%. Since the mAP and mRR shows greater improvements, this indicates that improvements to the clustering may yield even higher performance gains.

| Dataset | Train loss (Xavier uniform initialization, LLM embedding initialization) | Early Stop Epoch (Xavier uniform initialization, LLM embedding initialization) | MAP@10 (Xavier uniform initialization, LLM embedding initialization) | MAP@50 (Xavier uniform initialization, LLM embedding initialization) | MAP@100 (Xavier uniform initialization, LLM embedding initialization) |
|---|---|---|---|---|---|
| A | (0.145, 0.151) | (98, 75) | (4.864, 5.542) | (17.857, 20.968) | (28.528, 32.313) |
| B | (0.106, 0.114) | (70, 57) | (9.199, 9.414) | (43.522, 44.793) | (82.784, 84.978) |
| C | (0.074, 0.082) | (94, 53) | (9.142, 9.27) | (44.153, 44.455) | (85.517, 85.479) |
| D | (0.08, 0.089) | (90, 54) | (8.547, 8.757) | (39.106, 40.456) | (71.941, 74.655) |
| E | (0.092, 0.112) | (48, 31) | (8.815, 8.421) | (40.684, 38.341) | (74.772, 68.554) |
| F | (0.062, 0.061) | (30, 45) | (7.254, 7.356) | (30.338, 30.356) | (55.614, 54.689) |
| G | (0.076, 0.084) | (84, 69) | (7.688, 7.913) | (34.544, 35.454) | (64.64, 65.761) |
| H | (0.045, 0.047) | (76, 65) | (9.704, 9.713) | (48.281, 48.298) | (95.439, 95.534) |

-continued

| Dataset | MRR@100 (Xavier uniform initialization, LLM embedding initialization) | Homogeneity (Xavier uniform initialization, LLM embedding initialization) | Completeness (Xavier uniform initialization, LLM embedding initialization) | V-Measure (Xavier uniform initialization, LLM embedding initialization) |
|---|---|---|---|---|
| A | (0.718, 0.767) | (0.838, 0.848) | (0.553, 0.567) | (0.666, 0.68) |
| B | (0.967, 0.975) | (0.908, 0.899) | (0.258, 0.271) | (0.402, 0.416) |
| C | (0.962, 0.969) | (0.909, 0.898) | (0.301, 0.321) | (0.452, 0.473) |
| D | (0.946, 0.953) | (0.873, 0.859) | (0.25, 0.261) | (0.389, 0.4) |
| E | (0.952, 0.942) | (0.9, 0.877) | (0.219, 0.223) | (0.352, 0.355) |
| F | (0.868, 0.869) | (0.893, 0.86) | (0.48, 0.471) | (0.625, 0.609) |
| G | (0.891, 0.91) | (0.853, 0.829) | (0.313, 0.321) | (0.458, 0.463) |
| H | (0.985, 0.986) | (0.649, 0.591) | (0.009, 0.009) | (0.017, 0.017) |

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

obtaining tabular data related to an aspect of networking and computer security;

converting the tabular data to natural language for each row in the tabular data, wherein converting includes serializing, for each row, feature names and corresponding feature values into a natural language string that preserves relationships among the feature names and feature values within the row;

inputting the natural language for each row in the tabular data into a Large Language Model (LLM);

obtaining an output from the LLM for each row in the tabular data with embedded data therewith; and utilizing the output to train a machine learning model related to the aspect of networking and computer security, wherein the embedded data includes, for each row, an embedding vector generated by the LLM from the natural language string for that row to train the machine learning model, the embedding vector capturing relationships between elements within each row of the tabular data, and wherein utilizing the output to train the machine learning model includes using the embedding vector as an input feature for training the machine learning model or for initializing a knowledge graph used to train the machine learning model.

2. The method of claim 1, wherein the tabular data is obtained from a cloud-based system, and wherein the tabular data includes data collected based on inline monitoring of users, the Internet, and cloud services.

3. The method of claim 1, wherein the aspect of networking and computer security includes application segmentation, wherein the tabular data relates to users, data associated with the users, and application permissions for the users.

4. The method of claim 1, wherein the aspect of networking and computer security includes application segmentation, wherein the tabular data relates to users, identification information for the users, and server ports for applications are used by the users, and wherein the machine learning model is trained to determine which of the applications a new user should have access permissions.

5. The method of claim 1, wherein the aspect of networking and computer security includes classifications, wherein the tabular data relates to transactions and associated classifications.

6. The method of claim 5, wherein the classifications are for content of an associated Uniform Resource Location (URL).

7. The method of claim 1, wherein the relationships are drawn between a plurality of internet ports by, for each of the plurality of Internet ports represented in the tabular data:

submitting to the LLM a token sequence identifying the internet port;

obtaining from the LLM an embedding vector that encodes relationships for the internet port; and grouping the internet ports whose embedding vectors satisfy a similarity threshold, thereby forming port-clusters used for network-security policy enforcement.

8. The method of claim 1, wherein embedding vectors are used to initialize a knowledge graph that encodes user-app transactions, the initialization with the embedding vectors yielding lower initial training loss and faster convergence.

9. A non-transitory computer-readable medium comprising instructions that, when executed, cause one or more processors to perform steps of:

obtaining tabular data related to an aspect of networking and computer security;

converting the tabular data to natural language for each row in the tabular data, wherein converting includes serializing, for each row, feature names and corresponding feature values into a natural language string that preserves relationships among the feature names and feature values within the row;

inputting the natural language for each row in the tabular data into a Large Language Model (LLM);

obtaining an output from the LLM for each row in the tabular data with embedded data therewith; and utilizing the output to train a machine learning model related to the aspect of networking and computer security, wherein the embedded data includes, for each row, an embedding vector generated by the LLM from the natural language string for that row to train the machine learning model, the embedding vector capturing relationships between elements within each row of the tabular data, and wherein utilizing the output to train the machine learning model includes using the embedding vector as an input feature for training the machine learning model or for initializing a knowledge graph used to train the machine learning model.

10. The non-transitory computer-readable medium of claim 9, wherein the tabular data is obtained from a cloud-based system, and wherein the tabular data includes data collected based on inline monitoring of users, the Internet, and cloud services.

11. The non-transitory computer-readable medium of claim 9, wherein the aspect of networking and computer security includes application segmentation, wherein the tabular data relates to users, data associated with the users, and application permissions for the users.

12. The non-transitory computer-readable medium of claim 9, wherein the aspect of networking and computer security includes application segmentation, wherein the tabular data relates to users, identification information for the users, and server ports for applications are used by the users, and wherein the machine learning model is trained to determine which of the applications a new user should have access permissions.

13. The non-transitory computer-readable medium of claim 9, wherein the aspect of networking and computer security includes classifications, wherein the tabular data relates to transactions and associated classifications.

14. The non-transitory computer-readable medium of claim 13, wherein the classifications are for content of an associated Uniform Resource Location (URL).

15. An apparatus comprising:

one or more processors and memory storing instructions that, when executed, cause the one or more processors to:

obtain tabular data related to an aspect of networking and computer security;

convert the tabular data to natural language for each row in the tabular data, wherein converting includes serializing, for each row, feature names and corresponding feature values into a natural language string that preserves relationships among the feature names and feature values within the row;

input the natural language for each row in the tabular data into a Large Language Model (LLM);

obtain an output from the LLM for each row in the tabular data with embedded data therewith; and utilize the output to train a machine learning model related to the aspect of networking and computer security, wherein the embedded data includes, for each row, an embedding vector generated by the LLM from the natural language string for that row to train the machine learning model, the embedding vector capturing relationships between elements within each row of the tabular data, and wherein utilizing the output to train the machine learning model includes using the embedding vector as an input feature for training the machine learning model or for initializing a knowledge graph used to train the machine learning model.

16. The apparatus of claim 15, wherein the tabular data is obtained from a cloud-based system, and wherein the tabular data includes data collected based on inline monitoring of users, the Internet, and cloud services.

17. The apparatus of claim 15, wherein the aspect of networking and computer security includes application segmentation, wherein the tabular data relates to users, data associated with the users, and application permissions for the users.

18. The apparatus of claim 17, wherein the machine learning model is trained to determine what applications a new user should have access permissions.

19. The apparatus of claim 15, wherein the aspect of networking and computer security includes application segmentation, wherein the tabular data relates to users, identification information for the users, and server ports for applications are used by the users, and wherein the machine learning model is trained to determine which of the applications a new user should have access permissions.

20. The apparatus of claim 15, wherein the aspect of networking and computer security includes classifications, wherein the tabular data relates to transactions and associated classifications.

* * * * *